(12) United States Patent
May et al.

(10) Patent No.: US 9,805,422 B1
(45) Date of Patent: Oct. 31, 2017

(54) SYSTEMS AND METHODS FOR CALCULATING SEASONAL INSURANCE PREMIUMS

(75) Inventors: Jeffrey T May, Chicago, IL (US); Richard J Taranda, Lake Zurich, IL (US)

(73) Assignee: Allstate Insurance Company, Northbrook, IL (US)

( * ) Notice: Subject to any disclaimer, the term of this patent is extended or adjusted under 35 U.S.C. 154(b) by 133 days.

(21) Appl. No.: 13/479,732

(22) Filed: May 24, 2012

(51) Int. Cl.
*G06Q 40/00* (2012.01)
*G06Q 40/08* (2012.01)

(52) U.S. Cl.
CPC .................... *G06Q 40/08* (2013.01)

(58) Field of Classification Search
CPC ........ G06Q 10/00; G06Q 20/00; G06Q 30/00; G06Q 40/00
USPC ....................................................... 705/3–44
See application file for complete search history.

(56) References Cited

U.S. PATENT DOCUMENTS

| | | | |
|---|---|---|---|
| 4,837,693 A * | 6/1989 | Schotz ................... | G06Q 40/08 705/4 |
| 6,347,302 B1 | 2/2002 | Joao | |
| 7,328,179 B2 | 2/2008 | Sheehan et al. | |
| 7,366,679 B2 | 4/2008 | Yuyama | |
| 7,640,168 B2 | 12/2009 | Bartlit | |
| 7,647,252 B2 * | 1/2010 | Rampell ............ | G06Q 30/0207 705/26.4 |
| 7,801,798 B1 | 9/2010 | Huemer et al. | |
| 7,870,010 B2 | 1/2011 | Joao | |
| 8,005,734 B1 | 8/2011 | Strech | |
| 8,055,518 B2 | 11/2011 | Prieston | |
| 8,073,759 B1 | 12/2011 | Del Favero et al. | |
| 8,510,195 B2 * | 8/2013 | Goslinga ................ | G06Q 40/00 705/35 |
| 2004/0039608 A1 * | 2/2004 | Mazur .................... | G06Q 40/08 705/4 |
| 2004/0039609 A1 | 2/2004 | Burkitt | |
| 2005/0144041 A1 | 6/2005 | Essig et al. | |
| 2006/0173720 A1 | 8/2006 | Berens | |
| 2008/0027762 A1 | 1/2008 | Herzfeld | |

(Continued)

FOREIGN PATENT DOCUMENTS

| JP | 2001338146 | 12/2001 |
|---|---|---|
| WO | 2008057258 | 5/2008 |

OTHER PUBLICATIONS

"Designing Index Based Livestock Insurance for Managing Asset Risk in Northern Kenya".

(Continued)

*Primary Examiner* — Frantzy Poinvil
(74) *Attorney, Agent, or Firm* — Banner & Witcoff, Ltd.

(57) ABSTRACT

Insurance premiums for seasonal products may be generated. The insurance premium may be calculated by determining a historic seasonal variation in aggregate risk to an insurer; determining a predicted seasonal variation in aggregate risk to the insurer; and generating a premium installment payment schedule. The predicted seasonal variation in aggregate risk to the insurer may be based on the historical seasonal variation in aggregate risk. The premium installment payment schedule may be based on the predicted seasonal variation in aggregate risk. The monthly insurance premium may vary throughout the year and be based on a seasonal predicted risk to an insurer.

17 Claims, 8 Drawing Sheets

(56) References Cited

U.S. PATENT DOCUMENTS

| | | |
|---|---|---|
| 2008/0040155 A1 | 2/2008 | Ray et al. |
| 2009/0048877 A1 | 2/2009 | Binns et al. |
| 2009/0204529 A1 | 8/2009 | Warsaw |
| 2010/0063852 A1 | 3/2010 | Toll |
| 2010/0299162 A1* | 11/2010 | Kwan .................... G01C 21/34 705/4 |
| 2011/0137788 A1 | 6/2011 | Merkle |
| 2011/0161119 A1 | 6/2011 | Collins |
| 2011/0313793 A1* | 12/2011 | LaGiglia ................ G06Q 40/08 705/4 |
| 2011/0313796 A1 | 12/2011 | Joyce |
| 2012/0246060 A1* | 9/2012 | Conyack, Jr. .......... G06Q 40/02 705/38 |
| 2015/0142477 A1* | 5/2015 | Schuster .............. G06Q 10/063 705/4 |

OTHER PUBLICATIONS

"Agriculture Insurance".
"New Methodology for the Processing of Seasonal Items in the Harmonised Index of Consumer Prices (HICP)".

* cited by examiner

| Item Incurred Pure Premium | Year | | | | | |
|---|---|---|---|---|---|---|
| Individual Month | 2006 | 2007 | 2008 | 2009 | 2010 | Grand Total |
| JANUARY | 204.30 | 97.19 | 72.95 | 101.12 | 60.27 | 84.74 |
| FEBRUARY | 65.70 | 95.29 | 80.82 | 117.15 | 62.00 | 84.95 |
| MARCH | 142.95 | 189.70 | 140.73 | 124.58 | 114.11 | 130.96 |
| APRIL | 241.87 | 223.65 | 201.07 | 172.15 | 176.36 | 188.00 |
| MAY | 271.64 | 236.81 | 215.71 | 187.67 | 180.46 | 200.33 |
| JUNE | 239.56 | 266.42 | 287.65 | 165.17 | 214.84 | 222.03 |
| JULY | 316.92 | 295.89 | 296.80 | 215.16 | 216.83 | 247.37 |
| AUGUST | 311.48 | 258.31 | 294.14 | 219.55 | 176.87 | 230.20 |
| SEPTEMBER | 250.88 | 310.73 | 282.66 | 159.29 | 175.27 | 213.31 |
| OCTOBER | 231.07 | 192.92 | 204.01 | 144.39 | 148.21 | 169.33 |
| NOVEMBER | 151.46 | 118.07 | 126.92 | 105.85 | 90.27 | 109.42 |
| DECEMBER | 161.92 | 68.40 | 90.56 | 57.02 | 52.45 | 70.89 |
| Grand Total | 221.83 | 198.40 | 196.68 | 147.49 | 139.89 | 164.37 |

| Item Earned Exposures | | | | | | |
|---|---|---|---|---|---|---|
| Individual Month | Year | | | | | |
| | 2006 | 2007 | 2008 | 2009 | 2010 | Grand Total |
| JANUARY | 3407.02 | 7243.47 | 12705.45 | 21550.06 | 28628.62 | 73534.61 |
| FEBRUARY | 3567.74 | 7449.79 | 13049.27 | 22044.06 | 28951.11 | 75061.97 |
| MARCH | 3830.56 | 7831.58 | 13465.03 | 22528.16 | 29318.21 | 76973.54 |
| APRIL | 4312.47 | 8410.55 | 14424.79 | 23317.69 | 30196.12 | 80661.62 |
| MAY | 4920.90 | 9141.06 | 15712.32 | 24224.42 | 31181.20 | 85179.90 |
| JUNE | 5524.16 | 9927.30 | 17132.89 | 25151.40 | 32160.57 | 89896.31 |
| JULY | 6014.91 | 10518.05 | 18398.59 | 25892.19 | 32893.20 | 93716.94 |
| AUGUST | 6427.00 | 11036.24 | 19428.38 | 26623.63 | 33592.78 | 97108.03 |
| SEPTEMBER | 6715.51 | 11475.97 | 20056.76 | 27119.34 | 34082.16 | 99449.75 |
| OCTOBER | 6870.15 | 11782.17 | 20430.88 | 27461.87 | 34368.75 | 100913.82 |
| NOVEMBER | 6978.34 | 12041.03 | 20745.91 | 27788.24 | 34547.47 | 102100.99 |
| DECEMBER | 7110.23 | 12408.03 | 21167.28 | 28270.71 | 34723.90 | 103680.17 |
| Grand Total | 65679.00 | 119265.25 | 206717.56 | 301971.76 | 384644.09 | 1078277.65 |

Calendar Month Contribution to Calendar Year PP

| | 2006 | 2007 | 2008 | 2009 | 2010 | Total |
|---|---|---|---|---|---|---|
| JANUARY | 10.60 | 5.90 | 4.48 | 7.22 | 4.49 | 5.78 |
| FEBRUARY | 3.57 | 5.95 | 5.10 | 8.55 | 4.67 | 5.91 |
| MARCH | 8.34 | 12.46 | 9.17 | 9.29 | 8.70 | 9.35 |
| APRIL | 15.88 | 15.77 | 14.03 | 13.29 | 13.85 | 14.06 |
| MAY | 20.35 | 18.15 | 16.40 | 15.05 | 14.63 | 15.83 |
| JUNE | 20.15 | 22.18 | 23.84 | 13.76 | 17.96 | 18.51 |
| JULY | 29.02 | 26.09 | 26.42 | 18.45 | 18.54 | 21.50 |
| AUGUST | 30.48 | 23.90 | 27.65 | 19.36 | 15.45 | 20.73 |
| SEPTEMBER | 25.65 | 29.90 | 27.42 | 14.31 | 15.53 | 19.67 |
| OCTOBER | 24.17 | 19.06 | 20.16 | 13.13 | 13.24 | 15.85 |
| NOVEMBER | 16.09 | 11.92 | 12.74 | 9.74 | 8.11 | 10.36 |
| DECEMBER | 17.53 | 7.12 | 9.27 | 5.34 | 4.73 | 6.82 |
| Grand Total | 221.83 | 198.40 | 196.68 | 147.49 | 139.89 | 164.37 |

| | Percent Distribution to Calendar Year PP | | | | | |
|---|---|---|---|---|---|---|
| | 2006 | 2007 | 2008 | 2009 | 2010 | Total |
| JANUARY | 4.8% | 3.0% | 2.3% | 4.9% | 3.2% | 3.5% |
| FEBRUARY | 1.6% | 3.0% | 2.6% | 5.8% | 3.3% | 3.6% |
| MARCH | 3.8% | 6.3% | 4.7% | 6.3% | 6.2% | 5.7% |
| APRIL | 7.2% | 7.9% | 7.1% | 9.0% | 9.9% | 8.6% |
| MAY | 9.2% | 9.1% | 8.3% | 10.2% | 10.5% | 9.6% |
| JUNE | 9.1% | 11.2% | 12.1% | 9.3% | 12.8% | 11.3% |
| JULY | 13.1% | 13.2% | 13.4% | 12.5% | 13.3% | 13.1% |
| AUGUST | 13.7% | 12.0% | 14.1% | 13.1% | 11.0% | 12.6% |
| SEPTEMBER | 11.6% | 15.1% | 13.9% | 9.7% | 11.1% | 12.0% |
| OCTOBER | 10.9% | 9.6% | 10.3% | 8.9% | 9.5% | 9.6% |
| NOVEMBER | 7.3% | 6.0% | 6.5% | 6.6% | 5.8% | 6.3% |
| DECEMBER | 7.9% | 3.6% | 4.7% | 3.6% | 3.4% | 4.1% |
| Grand Total | 100.0% | 100.0% | 100.0% | 100.0% | 100.0% | 100.0% |

Installment schedule

| | | | | | |
|---|---|---|---|---|---|
| December 2011 | January 2012 | February 2012 | March 2012 | April 2012 | May 2012 |
| 3rd $24.13 | 3rd $24.13 | 3rd $24.13 | 3rd $48.25 | 3rd $48.25 | 3rd $48.25 |
| June 2012 | July 2012 | August 2012 | September 2012 | October 2012 | November 2012 |
| 3rd $78.41 | 3rd $84.44 | 3rd $78.41 | 3rd $48.25 | 3rd $48.25 | 3rd $48.25 |

SYSTEMS AND METHODS FOR CALCULATING SEASONAL INSURANCE PREMIUMS

TECHNICAL FIELD

The present disclosure relates generally to systems and methods for calculating and billing insurance premiums for seasonal use products.

BACKGROUND

Seasonal use products may include vehicles such as motorcycles, motor homes, boats, off-road vehicles and snowmobiles. Customers desiring to obtain insurance for seasonal use vehicles may be considered "seasonal customers" who, for example in the case of motorcycle insurance in cold climate states, may enter into a new policy in the spring, cancel it in the fall, and repeat this process each year. For an insurer, significant amounts of this type of behavior may cause net losses, because payouts on loss claims for the group of seasonal customers may exceed collected premiums in a given year. For example, the pool of seasonal customers may have a premium collection rate of only 50%, because only six months of premiums are paid, but incur 80% of the total losses during this six-month seasonal time frame.

In cases where insurance customers cancel and reinstate policies seasonally, an insurer's loss ratio, which represents the ratio of losses paid out to premiums collected, may exceed acceptable values. This may result in higher premiums for seasonal customers and/or other insurance customers. It may also cause an insurer to simply forego offering insurance coverage in states or regions.

Known approaches to addressing the above problems include short rating billing methods. Under a short rating billing method, an insurer may require an insurance customer to pay more of the premiums in advance to allow for seasonal risk variation. However, short rating billing methods may negatively impact customer loyalty because customers may perceive it to be unfair or penalizing. It would be advantageous to develop insurance billing methods to address the aforementioned shortcomings.

BRIEF SUMMARY

Embodiments of the disclosure relate to billing methods and systems, which provide for monthly installments for premium payments where the installment amounts are based on a predicted seasonal variation in aggregate risk to the insurer. As a result, the insurer earns premium in a manner that is more likely to track the way the insurer will incur loss for a seasonal product. The predicted seasonal variation in aggregate risk may be based on historical seasonal aggregate risk variations experienced by an insurer.

In an aspect of the disclosure, insurance premiums for a seasonal product may be generated. For each calendar month in a predetermined time, a historical incurred pure premium may be determined and a historical monthly exposure distribution may be determined. A monthly contribution may be calculated by applying the monthly exposure distribution to the historical incurred pure premium. A yearly insurance premium may be determined for a seasonal use product. A predicted seasonally adjusted pure premium for each calendar month may be determined and a premium payment schedule may be generated for the seasonal use product by applying the seasonally adjusted pure premium for each calendar month to the yearly premium.

In an aspect of the disclosure, monthly insurance payments for an entire year may be presented to a customer in a bill. The embodiments outlined in the disclosure may change the way an insurer bills, collects and earns premium. The earning of premium may be based on the historic seasonal variation in aggregate risk.

BRIEF DESCRIPTION OF THE DRAWINGS

The accompanying drawings, which are incorporated in and constitute a part of this specification, illustrate embodiments consistent with the disclosure and, together with the description, explain the various aspects of the disclosure. In the drawings.

DETAILED DESCRIPTION

In the following description of the various embodiments, reference is made to the accompanying drawings, which form a part hereof, and in which is shown by way of illustration, various embodiments that may be practiced. It is to be understood that other embodiments may be utilized and structural and functional modifications may be made without departing from the scope of the present disclosure.

Figure 1:
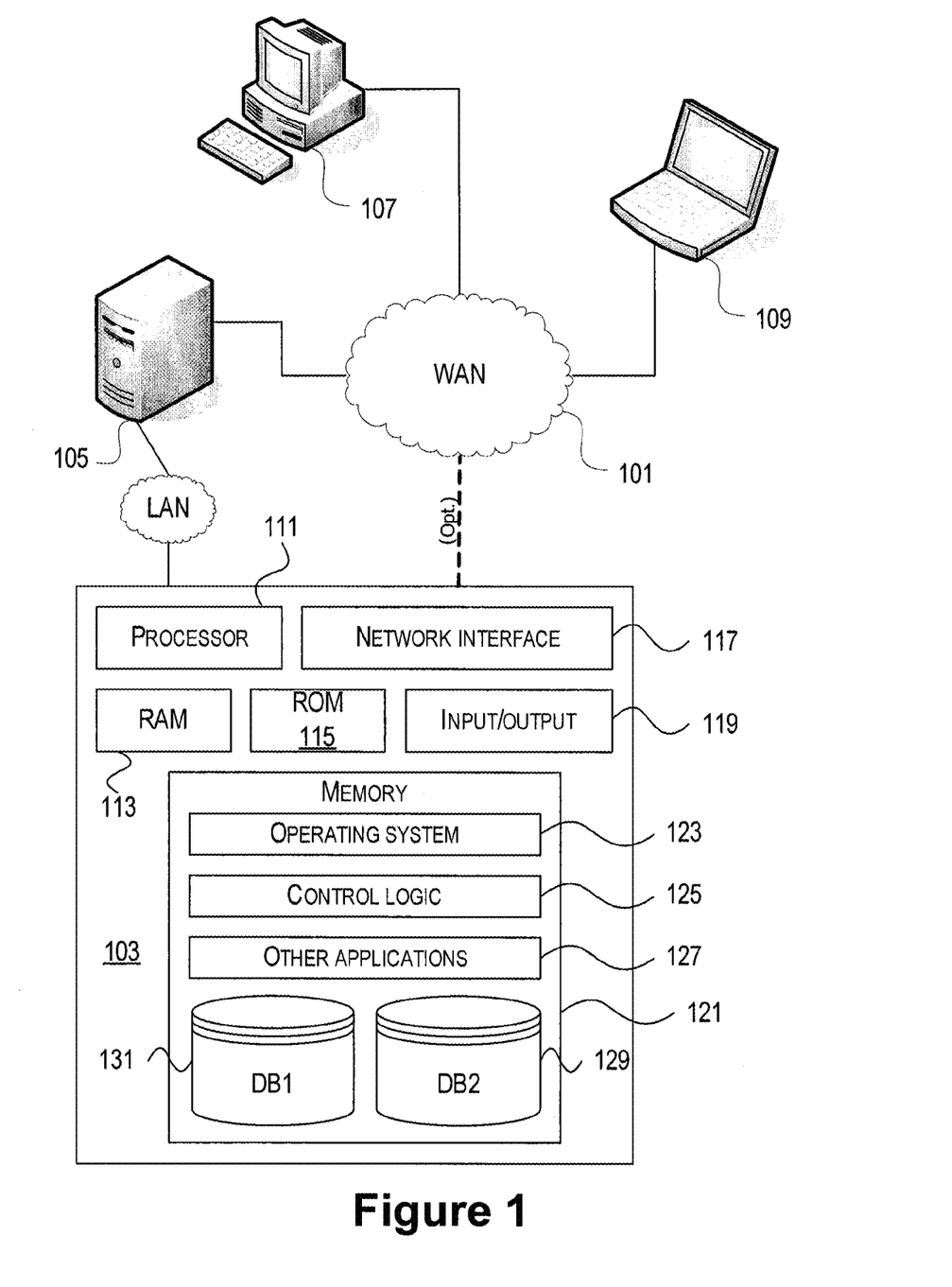
FIG. 1 shows a diagram of an insurance premium calculation and billing computer system that may be used to implement aspects of the disclosure.

FIG. 1 illustrates one example of a network architecture and data processing device that may be used to implement one or more illustrative aspects of the disclosure. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include insurance premium calculation and billing server 103, server 105, and user computers 107, 109. Insurance premium calculation and billing server 103 provides overall access, control and administration of databases and control software for performing one or more illustrative aspects of the disclosure as described herein. Insurance premium calculation and billing server 103 may be connected to actuarial server 105 through which users interact with and obtain data as requested. Alternatively, insurance premium calculation and billing server 103 may act as an actuarial server itself and be directly connected to the Internet. Insurance premium calculation and billing server 103 may be connected to actuarial server 105 through the network 101 (e.g., the Internet), via direct or indirect connection, or via some other network. Users may interact with the insurance premium calculation and billing server 103 using remote computers 107, 109, e.g., using a web browser to connect to the insurance premium calculation and billing server 103 via one or more externally exposed web sites hosted by actuarial server 105. Client computers 107 and 109 may be used in concert with insurance premium calculation and billing server 103 to access data stored therein, or may be used for other purposes. For example, from client device 107 a user may access actuarial server 105 using an Internet browser, as is known in the art, or by executing a software application that communicates with actuarial server 105 and/or insurance premium calculation and billing server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by actuarial server 105 and insurance premium calculation and billing server 103 may be combined on a single server.

Each component 103, 105, 107, 109 may be any type of known computer, server, or data processing device. Insurance premium calculation and billing server 103 may include a processor 111 controlling overall operation of the insurance premium calculation and billing server 103. Insurance premium calculation and billing server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing insurance premium calculation and billing server 103 to perform aspects of the disclosure as described herein, and other application software 127 providing secondary support, and/or other functionality which may or may not be used in conjunction with aspects of the present disclosure. The control logic may also be referred to herein as the insurance premium calculation and billing server software 125. Functionality of the insurance premium calculation and billing server software 125 may refer to operations or decisions made automatically based on rules coded into the control logic, made manually by a user providing input into the system, and/or a combination of automatic processing based on user input (e.g., queries, data updates, etc.). Those skilled in the art will realize that components 105, 107, and 109 may also include similar hardware components (e.g., processor, RAM/ROM, memory, etc. . . . ) as discussed above with respect to insurance premium calculation and billing server 103.

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a non-transitory computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 2:
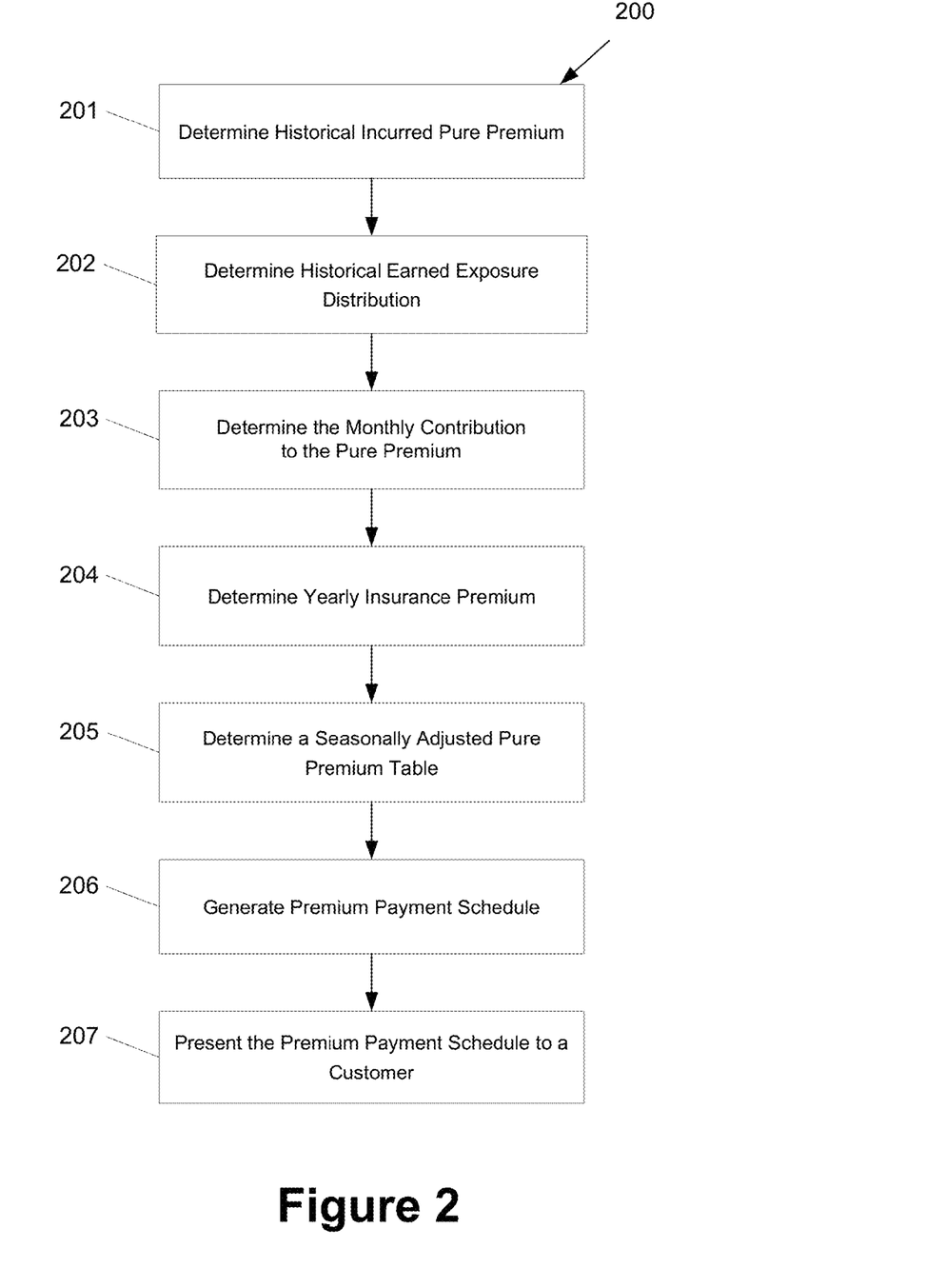
FIG. 2 illustrates an exemplary method of calculating and billing for seasonal insurance premiums for a seasonal product in accordance with one or more embodiments of the present disclosure.
Figure 3:
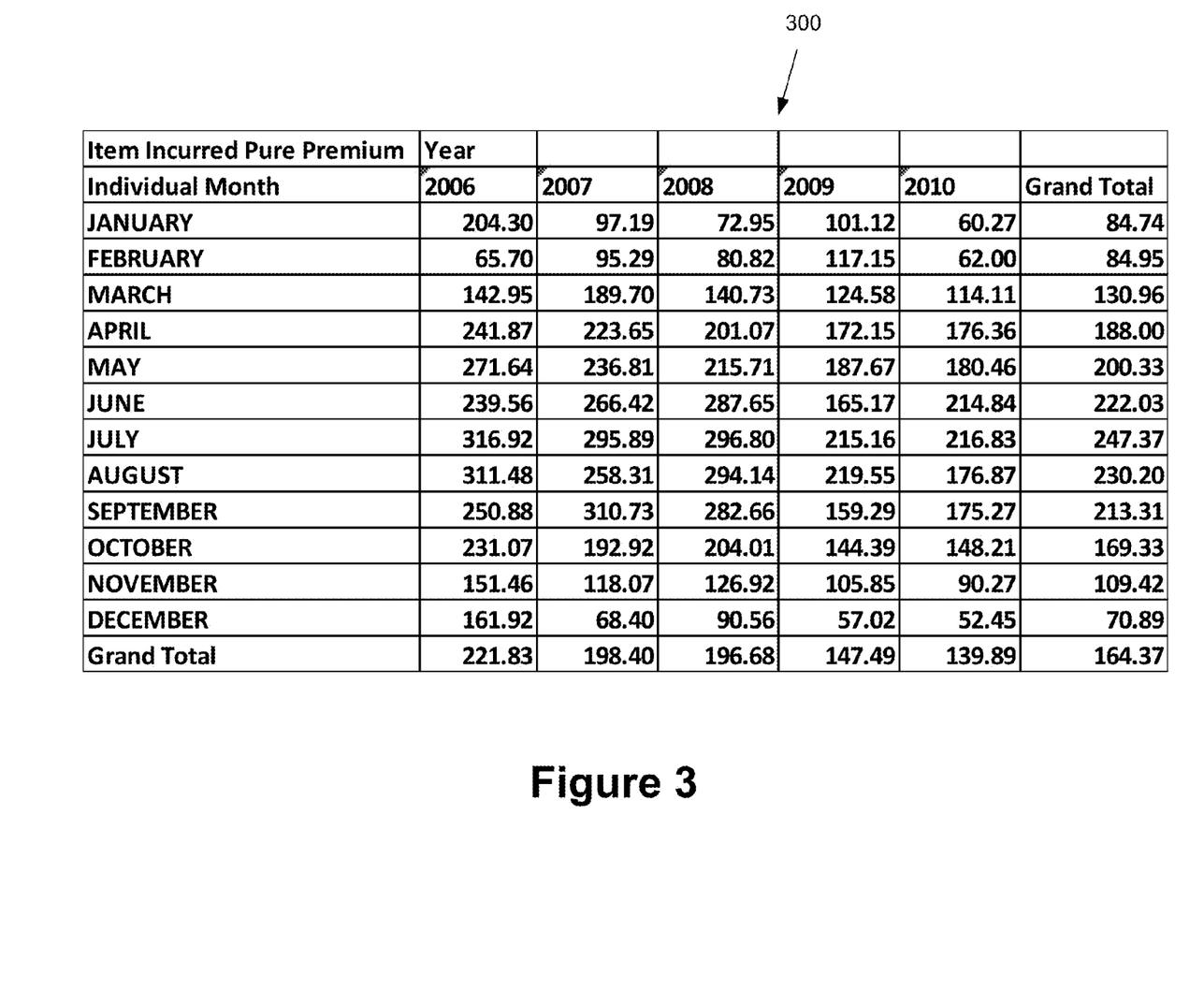
FIG. 3 illustrates exemplary historical incurred pure premiums that may be used for calculating seasonal insurance premiums in accordance with one or more embodiments of the present disclosure.

FIG. 2 illustrates an exemplary method 200 for generating insurance premiums for seasonal products. Seasonal products may include seasonal vehicles such as motorcycles, motor homes, boats, recreational vehicles, off-road vehicles, jet skis, and snowmobiles. Seasonal products may be products that are used during a portion of the calendar year. For example, seasonal products may be used during the summer or the winter months. In step 201, a historical incurred pure premium for a seasonal product may be determined. The historical incurred pure premium may be the average loss per exposure for the given historical time period. Expenses may also be included in this calculation. The historical incurred pure premium may be determined by calculating a portion of the total insurance premium collected by an insurer that is needed to pay claim losses for a seasonal product or type of seasonal product over a predetermined time. The predetermined time may be any amount of time. For example, the predetermined time may be one year, two years, five years, ten years, or the like. A representative table 300 in FIG. 3 illustrates the collected historical incurred pure premium for a seasonal product over a five-year period. In at least one embodiment, the historical incurred pure premium may be representative of the historic seasonal variation in aggregate risk to an insurer.

Figure 4:
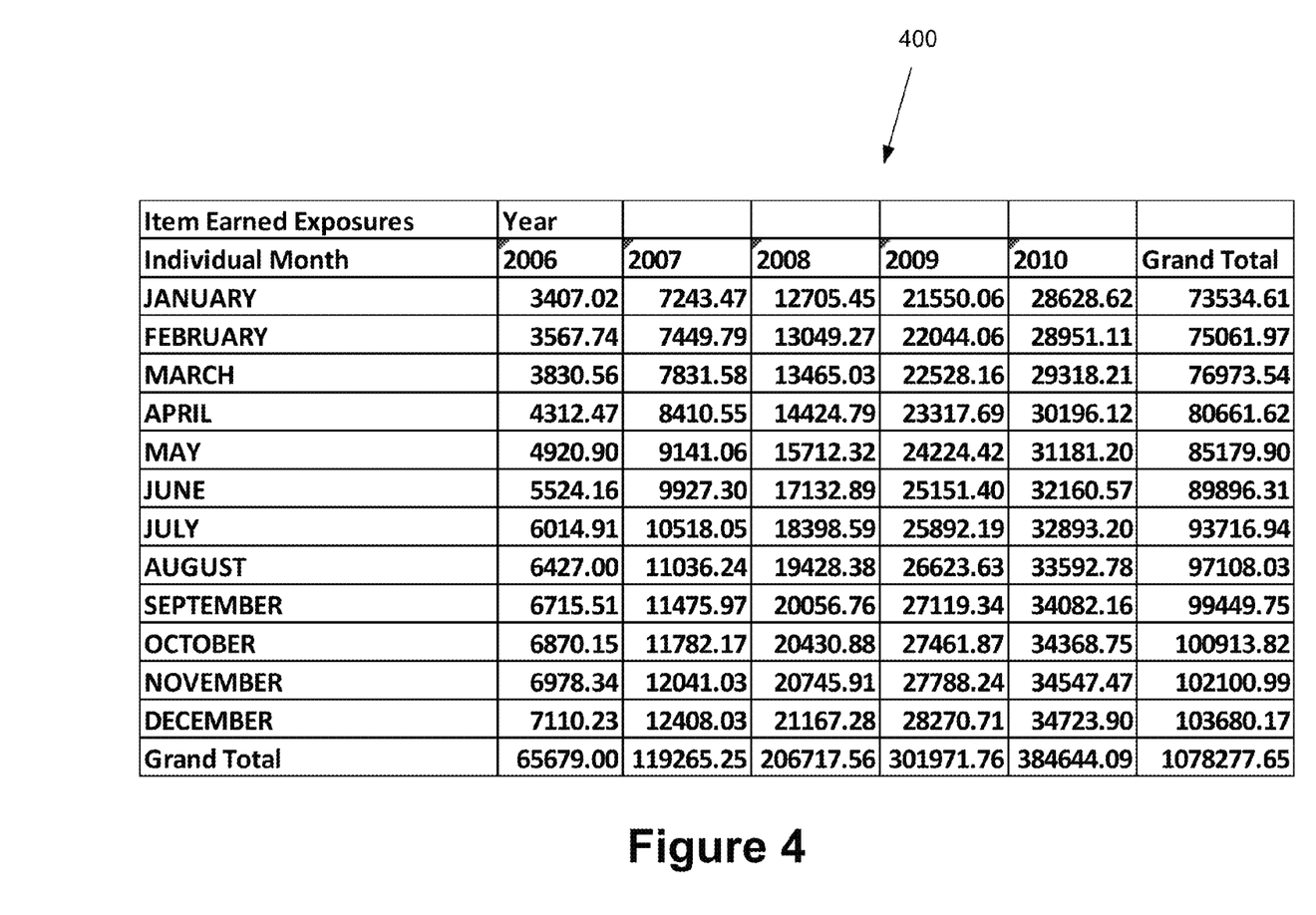
FIG. 4 illustrates exemplary historical earned exposure to an insurer that may be used for calculating seasonal insurance premiums in accordance with one or more embodiments of the present disclosure.

Referring back to FIG. 2, as illustrated in step 202, a historical earned exposure distribution may be determined. The historical earned exposure distribution is the percentage distribution of exposures earned over an incremental time period during the selected historical time period. The historical earned exposure distribution may be determined for any amount of time. In at least one embodiment, the historical earned exposure distribution is determined for the same amount of time that the historical pure premium is collected. A representative table 400 in FIG. 4 depicts the historical earned exposure distribution for a five-year period.

Figure 5A:
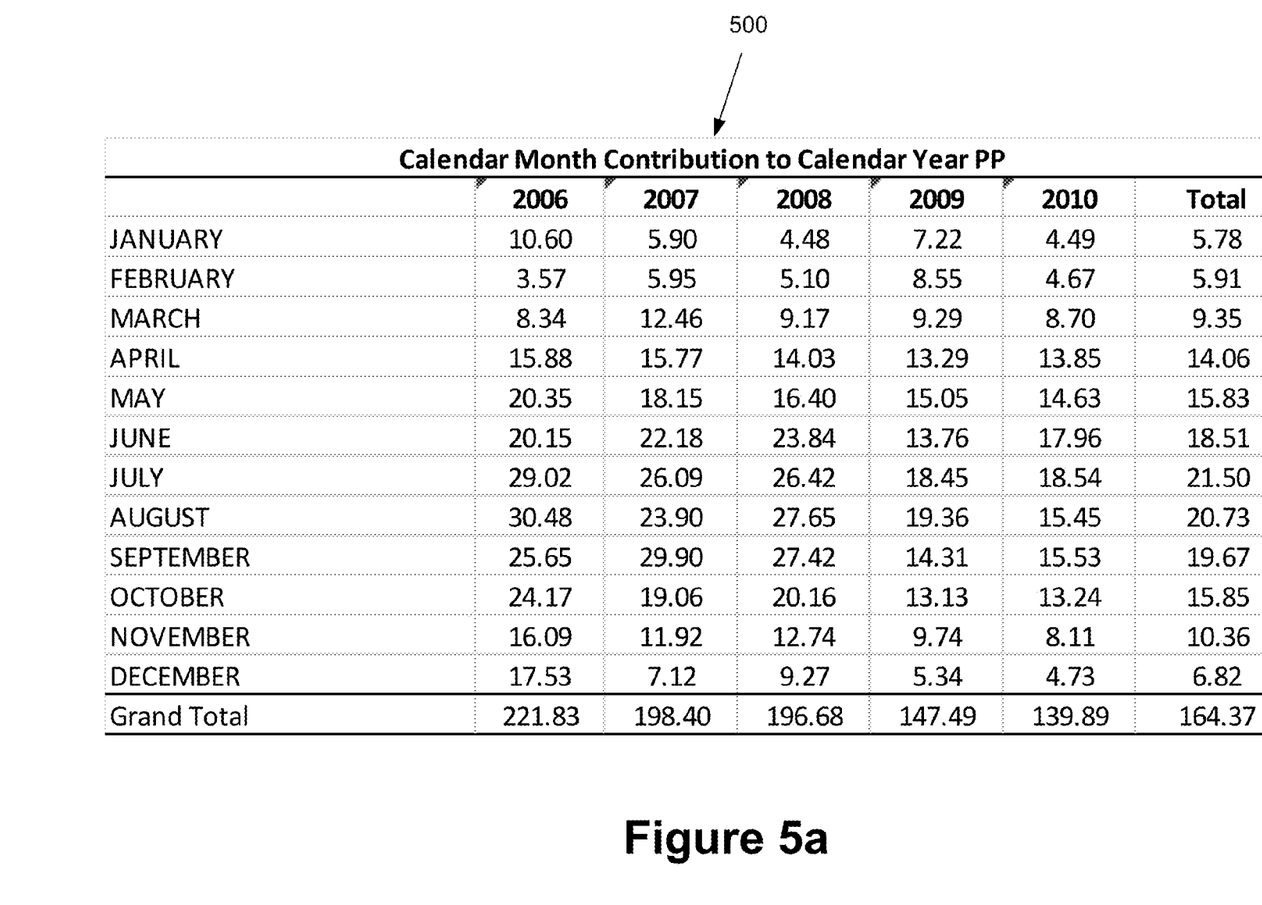
FIGS. 5a and 5b illustrate exemplary monthly contributions to the incurred pure premium that may be used for calculating seasonal insurance premiums in accordance with one or more embodiments of the present disclosure.
Figure 5B:
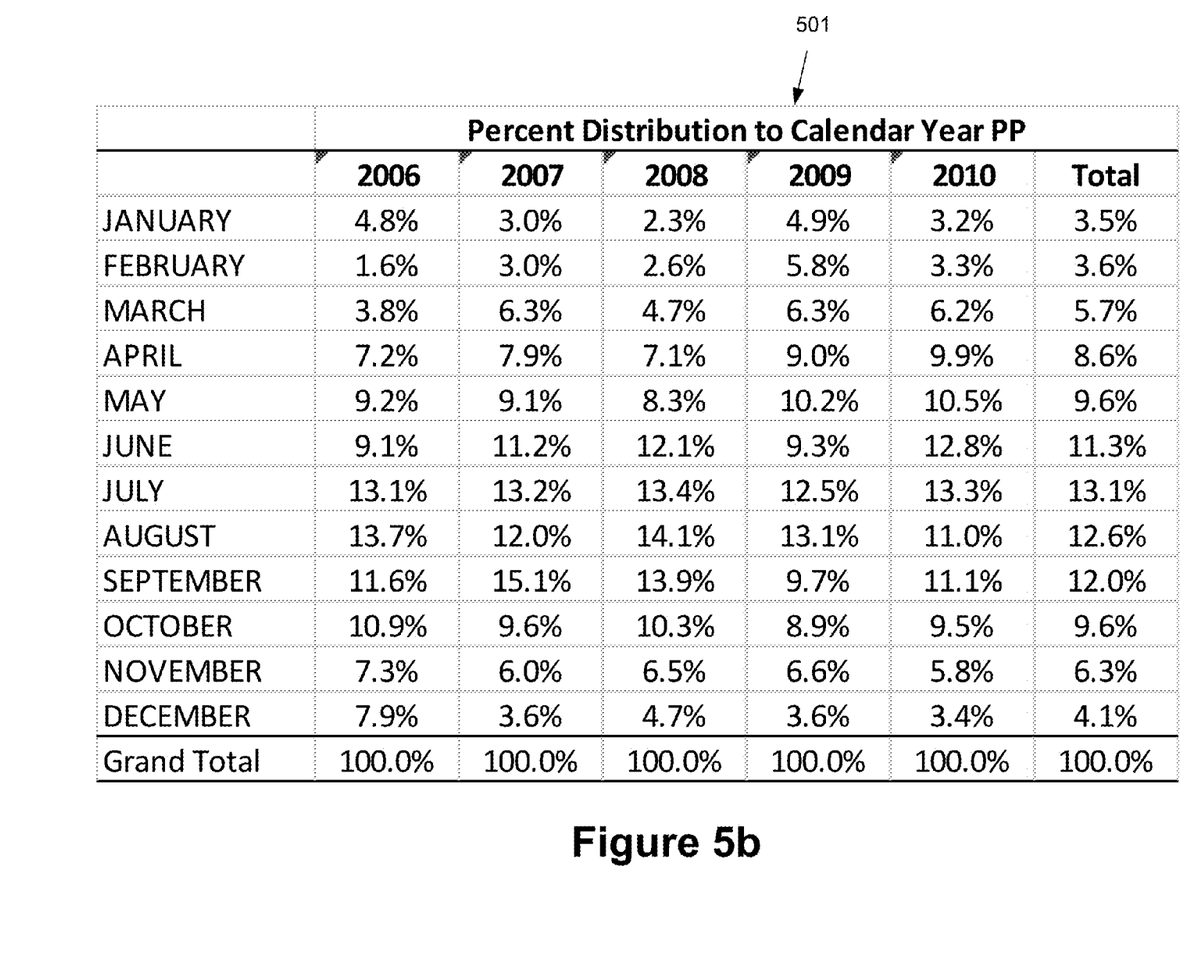

Referring back to FIG. 2, as illustrated in step 203, the monthly contribution to the incurred pure premium may be calculated. The monthly contribution may be representative of the total aggregate monthly risk to an insurer. The monthly contribution may be determined by calculating the percentage of the earned exposure distribution for each month and then multiplying the monthly earned exposure distribution percentage by the monthly incurred pure premium. Representative tables 500 and 501 in FIGS. 5a and 5b depict the calculated monthly contribution. The monthly contribution may be calculated for the same time period as the historical insurance premiums were calculated. For example, if the historical insurance premiums are calculated for five years, the monthly contribution may be calculated for the same five years. In at least one embodiment, as depicted in FIG. 5a, the monthly contribution may be represented in the form of currency, such as U.S. dollars. Alternatively, as depicted in FIG. 5b, the monthly contribution may be represented as a percentage of the yearly contribution.

Referring back to FIG. 2, as illustrated in step 204, a yearly insurance premium for a seasonal product may be calculated. The yearly insurance premium for the seasonal product may be calculated in various ways. The yearly insurance premium may be calculated based upon a number of factors including historical losses, expenses, geographic location, driving/riding experience, Insurance Score, and vehicle/cycle type.

As illustrated in step 205, a predicted seasonally adjusted pure premium table may be generated. The predicted seasonally adjusted pure premium table may be generated by determining the total monthly percentage of the monthly contribution for a predetermined time. The predetermined time may be any amount of time. In at least one embodiment, the predetermined time is the same predetermined time that the historical incurred pure premiums were calculated. For example, if the historical incurred pure premiums were calculated for a five year period, the seasonally adjusted pure premium table will reflect the total monthly percentage for the same five year period. In at least one embodiment, the predicted seasonally adjusted pure premium may be representative of the predicted seasonal variation in aggregate risk to an insurer. The predicted seasonal variation in aggregate risk to the insurer may correspond to or be based on the historic seasonal variation in aggregate risk to the insurer.

Figure 6:
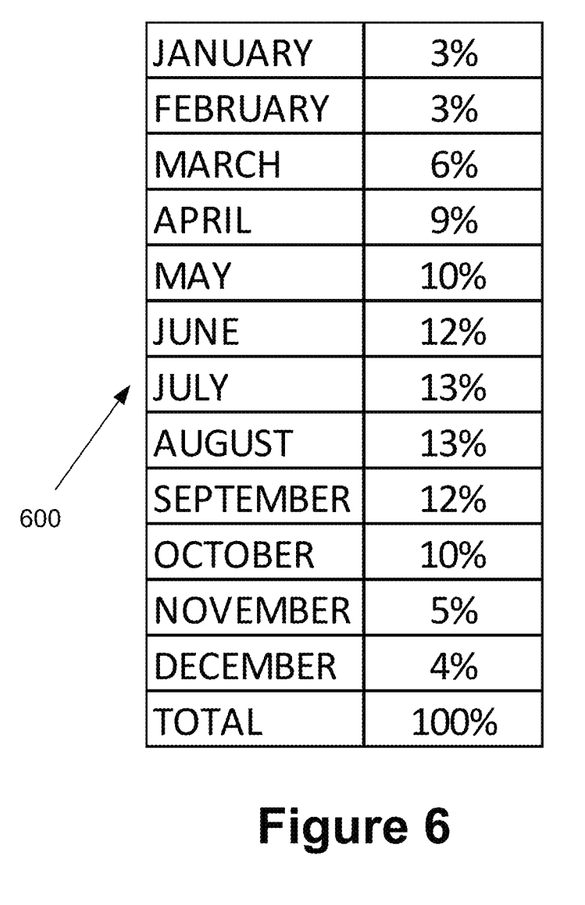
FIG. 6 illustrates an exemplary predicted adjusted pure insurance premium table in accordance with one or more embodiments of the present disclosure.

FIG. 6 depicts a representative table 600 showing seasonally predicted monthly premium percentages. In at least one embodiment, the seasonally predicted monthly premium percentages may be determined from historical incurred pure premium data. For example, the seasonally predicted monthly premium percentages may be representative of the five-year average of the monthly contribution percentage, as shown in the "Total" column in FIG. 5b. Alternatively, the predicted seasonally adjusted pure premium table may be generated using weighting factors.

Referring back to FIG. 2, as illustrated in step 206, a monthly insurance premium schedule may be generated. The monthly insurance premium schedule may be generated by applying the percentages in the seasonally adjusted pure premium table to the total annual premium. In at least one embodiment, the monthly insurance premium payment schedule is based on the predicted seasonal variation in aggregate risk to the insurer.

Figure 7:
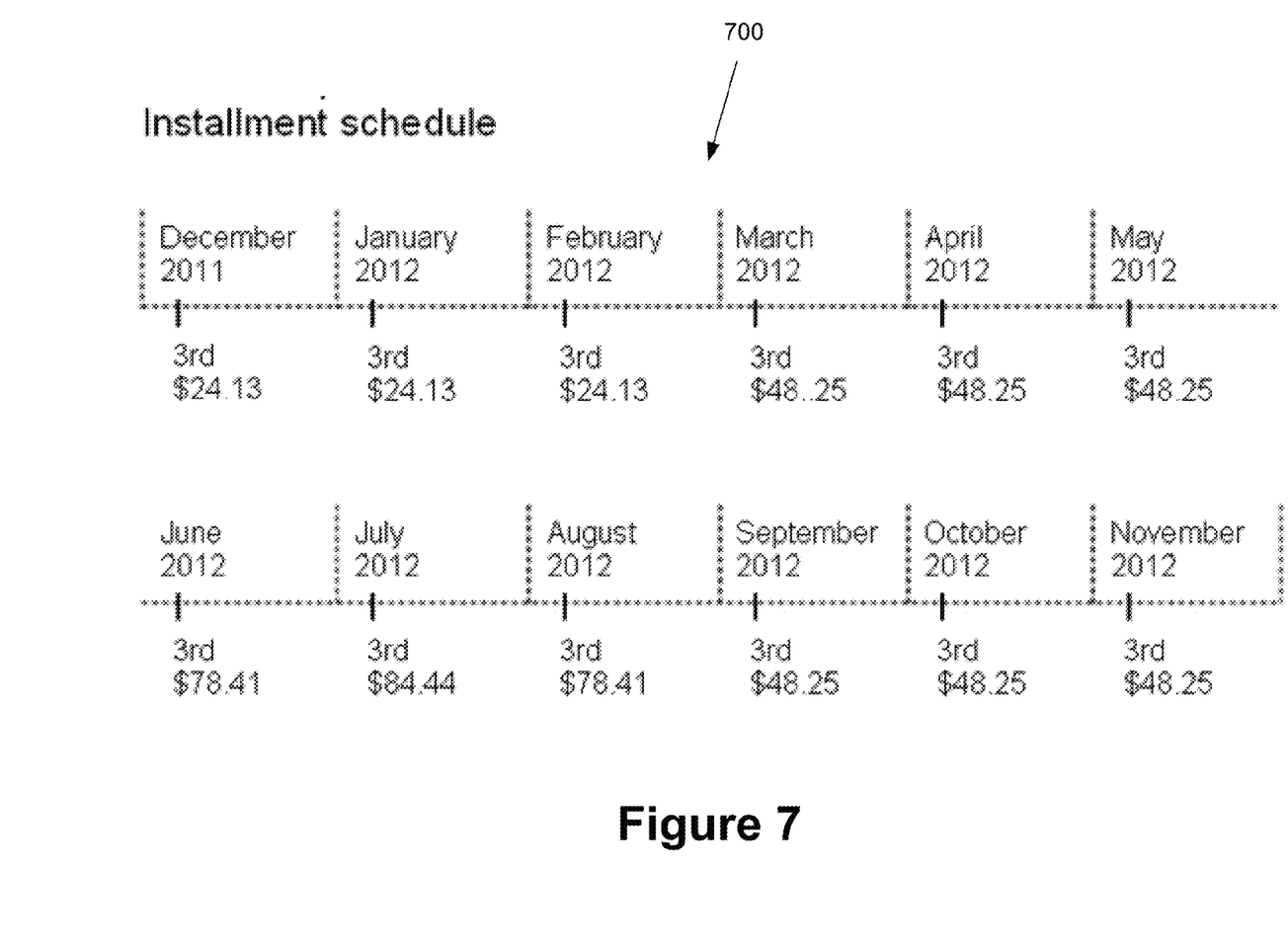
FIG. 7 illustrates an exemplary installment schedule of seasonal insurance premiums in accordance with one or more embodiments of the present disclosure.

FIG. 7 depicts an exemplary monthly installment schedule 700 of an insurance premium for a seasonal product. The installment schedule may be presented to the customer in a printed, electronic or online billing statement. The monthly installment amounts may vary with the predicted monthly variation in risk to the insurer. Alternatively the monthly installment amounts may vary with the amount of use of the seasonal product or the risk of loss or damage to the seasonal product.

The billing method and system of the disclosure provides benefits in terms of reducing the likelihood that customers will cancel and reinitiate policies seasonally. The premium installment schedule may show a correlation with the customer's seasonal use of the insured vehicle or other asset. However, the premium installment schedule may not be based on use of the insured product. Thus, for lower use months, such as the winter months for motorcycle use in colder climates, the installment schedule may provide a lower monthly payment. Similarly, for higher-use summer months, the installments may be higher. This provides a payment approach that may be more reasonable to the customer than previous methods and systems. As a result, customers may be less likely to cancel policies in the low-use months in favor of simply making the lower monthly payments.

As an example, using the outlined method, instead of an insured person paying a fixed monthly premium (e.g. $20 for 12 months), the insured may pay $50/month for a 4-month "in-season" period in which the insurer's aggregate risk has historically been higher, and less of a monthly payment $5 for an 8-month "out-of-season" period in which the insurer's aggregate risk has historically been lower. The total annual premium remains the same—$240/year, but the billing method may correspond more closely to seasonal variation in the way the insurer is likely to incur loss. As a result, customer seasonal premium payment behavior is not likely to negatively impact the insurer to the same degree as an identical-installment model since the premium installments paid during higher-use months are higher. Moreover, the schedule for premium installments may correspond to the general trend of insurer risk and is thus may appear more reasonable to the insured.

The foregoing descriptions have been presented for purposes of illustration and description. They are not exhaustive and do not limit the disclosure to the precise form disclosed. Modifications and variations are possible in light of the above teachings or may be acquired from practicing the disclosure. For example, the described implementation includes software but the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

Other embodiments of the disclosure will be apparent to those skilled in the art from consideration of the specification and practice of the disclosure disclosed herein. The specification and examples should be considered as exemplary only, with a true scope and spirit of the disclosure being indicated by the following claims.

What is claimed is:

1. A computer-implemented method for developing a seasonal payment schedule for insurance premiums comprising:
   determining, by an insurance premium calculation and billing server, a historic seasonal variation in aggregate risk to an insurer, wherein the insurance premium calculation and billing server includes a processor that controls operation of the insurance premium calculation and billing server, memory that stores an operating system software for controlling overall operation of the insurance premium calculation and billing server, a network interface, and input/output interfaces and the insurance premium calculation and billing server provides overall access, control, and administration of databases and the operating system software;
   determining, by the insurance premium calculation and billing server, a real-time predicted seasonal variation in aggregate risk to the insurer, wherein the real-time predicted seasonal variation in aggregate risk is based on the historical seasonal variation in aggregate risk, wherein the aggregate risk is the real-time predicted seasonal variation based from the historical seasonal variation of risk towards the insurer;
   generating, by the insurance premium calculation and billing server, a premium installment payment schedule for a seasonal product based on the real-time predicted seasonal variation in aggregate risk, wherein the seasonal product is only used during a portion of a calendar year;
   generating a real-time notification when there is a change in the premium installment payment schedule for the seasonal product based on the real-time predicted season variation in aggregate risk to the insurer;
   sending, over the Internet to an application on a client device, the real-time notification to cause the application to display an alert to adjust the premium installment payment schedule for the seasonal product based on the real-time predicted season variation in aggregate risk to the insurer; and
   presenting, by the insurance premium calculation and billing server, the generated premium installment payment schedule to a customer in a billing statement.

2. The method of claim 1, wherein the premium installment payment schedule includes at least one monthly premium.

3. The method of claim 2, wherein the amount of the at least one monthly premium corresponds to a likelihood of damage to the seasonal product.

4. The method of claim 2, wherein the amount of the at least one monthly premium corresponds to a predicted risk of loss to an insurer.

5. The method of claim 2, wherein the billing statement is one of a printed, electronic, or online bill.

6. The method of claim 2, wherein the amount of the at least one monthly premium corresponds to predicted usage of the seasonal product.

7. The method of claim 1, wherein the seasonal product is one of a motorcycle, a boat, a recreational vehicle, a snowmobile, a jet ski, a motor home, or an off-road vehicle.

8. One or more non-transitory computer readable storage media storing computer readable instructions that, when executed, cause a computer at least to perform:
   determining, by an insurance premium calculation and billing server, a historic seasonal variation in aggregate risk to an insurer, wherein the insurance premium calculation and billing server includes a processor that controls operation of the insurance premium calculation and billing server, memory that stores an operating system software for controlling overall operation of the insurance premium calculation and billing server, a network interface, and input/output interfaces and the insurance premium calculation and billing server provides overall access, control, and administration of databases and the operating system software;
   determining, by the insurance premium calculation and billing server, a real-time predicted seasonal variation in aggregate risk to the insurer, wherein the real-time predicted seasonal variation in aggregate risk is based on the historical seasonal variation in aggregate risk, wherein the aggregate risk is the real-time predicted seasonal variation based from the historical seasonal variation of risk towards the insurer;
   generating, by the insurance premium calculation and billing server, a premium installment payment schedule for a seasonal product based on the real-time predicted seasonal variation in aggregate risk, wherein the seasonal product is only used during a portion of a calendar year;
   generating a real-time notification when there is a change in the premium installment payment schedule for the seasonal product based on the real-time predicted season variation in aggregate risk to the insurer;
   sending, over the Internet to an application on a client device, the real-time notification to cause the application to display an alert to adjust the premium installment payment schedule for the seasonal product based on the real-time predicted season variation in aggregate risk to the insurer; and
   presenting, by the insurance premium calculation and billing server, the generated premium installment payment schedule to a customer in a billing statement.

9. The computer readable storage media of claim 8, wherein, the premium installment payment schedule includes premium payments for each month of a calendar year.

10. The computer readable storage media of claim 9, wherein the monthly premium payment is higher for months having a higher likelihood of damage to the seasonal product.

11. The computer readable storage media of claim 10, wherein the monthly premium payment is lower for months having a lower likelihood of damage to the seasonal product.

12. The computer readable storage media of claim 8, wherein determining the real-time predicted seasonal variation in aggregate risk to an insurer includes determining a monthly weighting factor.

13. The computer readable storage media of claim 8, wherein determining the real-time predicted seasonal variation in aggregate risk to an insurer includes determining an average monthly aggregated risk to an insurer.

14. A system comprising:
an insurance premium calculation and billing server that provides overall access, control, and administration of databases and an operating system software, the insurance premium calculation and billing server includes:
a processor controlling the operation of the insurance premium calculation and billing server;
a network interface; and
input/output interfaces; and
a memory that stores the operating system software for controlling overall operation of the insurance premium calculation and billing server, the memory storing computer executable instructions that when executed cause the system at least to:
determine a historic seasonal variation in aggregate risk to an insurer;
determine a real-time predicted seasonal variation in aggregate risk to the insurer,
wherein the real-time predicted seasonal variation in aggregate risk is based on the historical seasonal variation in aggregate risk, wherein the aggregate risk is the real-time predicted seasonal variation based from the historical seasonal variation of risk towards the insurer;
generate a premium installment payment schedule for a seasonal product based on the real-time predicted seasonal variation in aggregate risk, wherein the seasonal product is only used during a portion of a calendar year;
generate a real-time notification when there is a change in the premium installment payment schedule for the seasonal product based on the real-time predicted season variation in aggregate risk to the insurer;
send, over the Internet to an application on a client device, the real-time notification to cause the application to display an alert to adjust the premium installment payment schedule for the seasonal product based on the real-time predicted season variation in aggregate risk to the insurer; and
present the generated premium installment payment schedule to a customer in a billing statement.

15. The system of claim 14, wherein to determine the historic seasonal variation in aggregate risk to an insurer includes to determine a portion of premiums collected that are needed to pay claims for damages to a type of seasonal product.

16. The system of claim 14, wherein the premium installment payment schedule includes monthly premium payments for each month of a calendar year.

17. The system of claim 16, wherein the monthly premium payments vary based on the predicted variation in risk to an insurer.

* * * * *

UNITED STATES PATENT AND TRADEMARK OFFICE
CERTIFICATE OF CORRECTION

| | | |
|---|---|---|
| PATENT NO. | : 9,805,422 B1 | Page 1 of 1 |
| APPLICATION NO. | : 13/479732 | |
| DATED | : October 31, 2017 | |
| INVENTOR(S) | : May et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,111 days.

Signed and Sealed this
Seventh Day of February, 2023

Katherine Kelly Vidal
*Director of the United States Patent and Trademark Office*